United States Patent
Wang et al.

(10) Patent No.: US 12,005,584 B2
(45) Date of Patent: Jun. 11, 2024

(54) POSE CONTROL METHOD, ROBOT AND COMPUTER-READABLE STORAGE MEDIUM

(71) Applicant: UBTECH ROBOTICS CORP LTD, Shenzhen (CN)

(72) Inventors: Hongge Wang, Shenzhen (CN); Chunyu Chen, Shenzhen (CN); Yizhang Liu, Shenzhen (CN); Ligang Ge, Shenzhen (CN); Jie Bai, Shenzhen (CN); Xingxing Ma, Shenzhen (CN); Jiangchen Zhou, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 415 days.

(21) Appl. No.: 17/488,341

(22) Filed: Sep. 29, 2021

(65) Prior Publication Data
US 2022/0193899 A1    Jun. 23, 2022

Related U.S. Application Data

(63) Continuation of application No. PCT/CN2020/139896, filed on Dec. 28, 2020.

(30) Foreign Application Priority Data

Dec. 22, 2020    (CN) .......................... 202011532454.5

(51) Int. Cl.
*B25J 9/16*     (2006.01)
*B25J 13/08*    (2006.01)

(52) U.S. Cl.
CPC .......... *B25J 9/1653* (2013.01); *B25J 9/1607* (2013.01); *B25J 9/1664* (2013.01); *B25J 13/088* (2013.01)

(58) Field of Classification Search
CPC ...... B25J 9/1653; B25J 9/1607; B25J 9/1664; B25J 13/088
See application file for complete search history.

(56) References Cited

U.S. PATENT DOCUMENTS

| | | | |
|---|---|---|---|
| 2013/0226345 A1* | 8/2013 | Zhao | B25J 13/088 700/258 |
| 2016/0052574 A1* | 2/2016 | Khripin | B25J 9/1694 901/1 |

(Continued)

FOREIGN PATENT DOCUMENTS

CN    104407611 A    3/2015

OTHER PUBLICATIONS

ISR for PCT/CN2020/139896.
Written opinions of ISA for PCT/CN2020/139896.

*Primary Examiner* — Behrang Badii
*Assistant Examiner* — Jay Khandpur

(57) ABSTRACT

A pose control method for a robot includes: estimating a first set of joint angular velocities of all joints of the robot according to a balance control algorithm; estimating a second set of joint angular velocities of all joints of the robot according to a momentum planning algorithm; estimating a third set of joint angular velocities of all joints of the robot according to a pose return-to-zero algorithm; and performing pose control on the robot according to the first set of joint angular velocities, the second set of joint angular velocities, and the third set of joint angular velocities.

20 Claims, 6 Drawing Sheets

(56) References Cited

U.S. PATENT DOCUMENTS

2018/0093725 A1* 4/2018 Uemura ............... B62D 57/032
2020/0369333 A1* 11/2020 Lavalley .............. B25J 11/0035
2021/0379774 A1* 12/2021 Pounds ................. B25J 13/089

* cited by examiner

POSE CONTROL METHOD, ROBOT AND COMPUTER-READABLE STORAGE MEDIUM

CROSS REFERENCE TO RELATED APPLICATIONS

The present application is a continuation-application of International Application PCT/CN2020/139896, with an international filing date of Dec. 28, 2020, which claims foreign priority of Chinese Patent Application No. 202011532454.5, filed on Dec. 22, 2020 in the China National Intellectual Property Administration, the contents of all of which are hereby incorporated by reference.

BACKGROUND

1. Technical Field

The present disclosure generally relates to robots, and particularly to a pose control method and a legged robot.

2. Description of Related Art

Compared with wheeled and tracked robots, one advantage of biped robots is that they can fully adapt to the human living environment, such as walking on uneven ground, up and down stairs, etc. When a biped robot is walking, especially during the single-foot support phase, balance control is an important task. The balance control may lead to rotation of the robot's torso. If it is not recovered in time, when the rotation range is too large, the robot may fall over.

Therefore, there is a need to provide a pose control method and robot to overcome above-mentioned problem.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
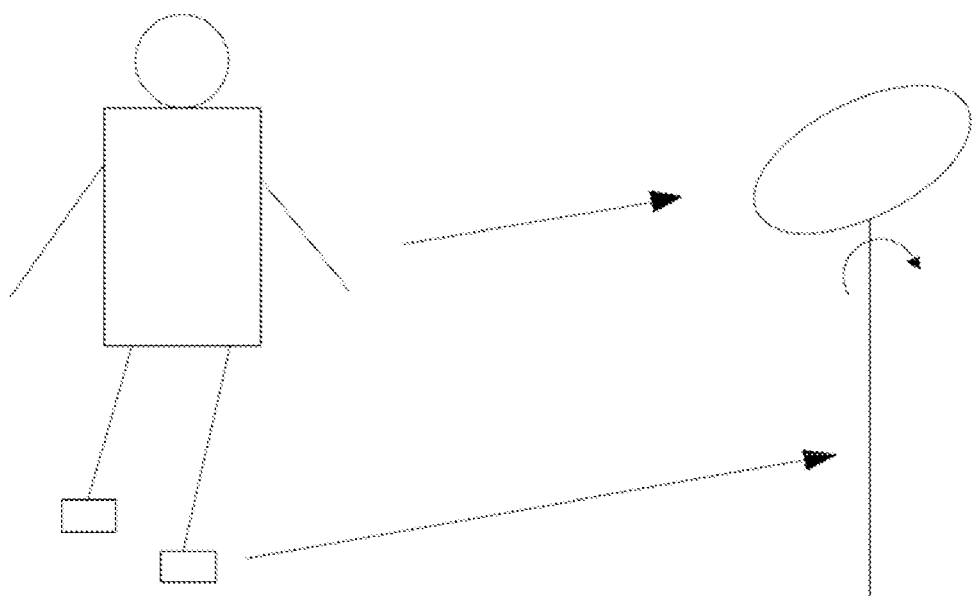
FIG. 1 is a schematic diagram of a flying wheel model.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

The present disclosure provides a legged robot. For simplicity of description, unless otherwise specified, the robots mentioned in the embodiments of the present disclosure are biped robots.

The walking of a biped robot can be described as a cyclic pattern of body movements which advances the robot's position. Assuming that all walking cycles are about the same, studying the walking process can be simplified by investigating one walking cycle. In general, each of these walking cycles is composed of two phases: a single-support phase and a double-support phase. During the single-support phase, one leg is on the ground and the other leg is experiencing a swinging motion. The double-support phase starts once the swinging leg meets the ground and ends when the support leg leaves the ground.

When the robot is in the single-support phase, it can be equivalent to a flywheel model. Generally, the entire support leg of the robot can be equivalent to the massless long rod of the flywheel model, and the parts other than the support leg are equivalent to the flywheel. However, because the support leg of the biped robot may have a relatively large mass, equating it to a massless long rod will cause a large error.

In view of this, in the embodiments of the present disclosure, a new flywheel model different from the conventional flywheel model is established. FIG. 1 is a schematic diagram of the new flywheel model, where the support foot of the robot is equivalent to the massless long rod of the flywheel model, and the other parts of the robot are equivalent to the flywheel of the flywheel model. The balance control process may cause the robot torso to rotate. Since the robot torso is not like a flywheel that can rotate continuously and infinitely, the robot may fall over if the robot torso is not recovered in time and the rotation range is too large.

Figure 2:
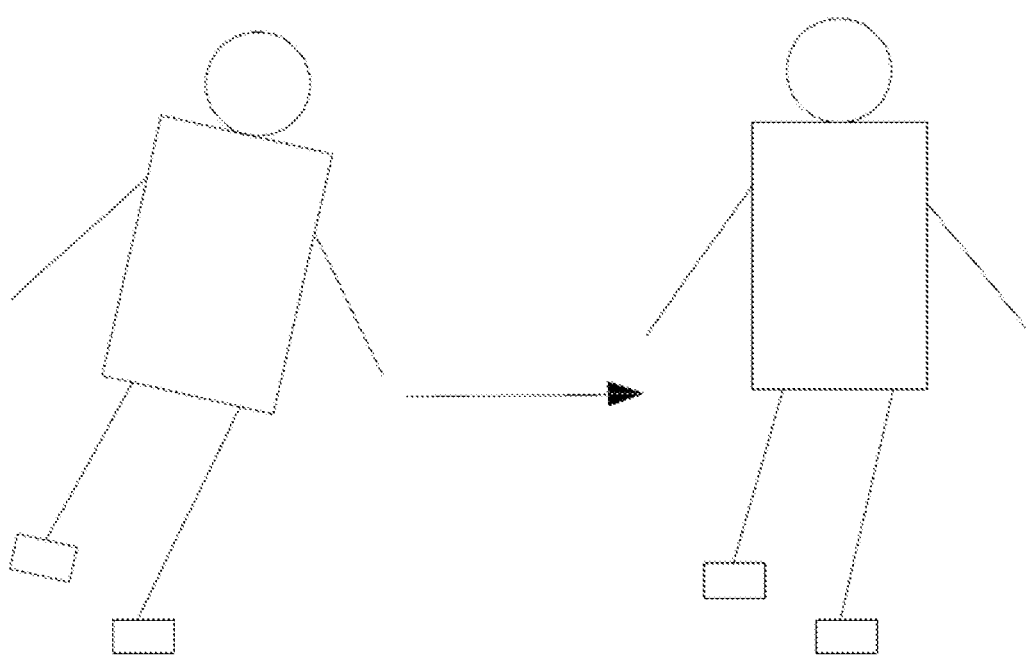
FIG. 2 is a schematic diagram showing a biped robot returning to an initial pose.

In the embodiments of the present disclosure, with the balance control, momentum planning, and pose return-to-zero control of the robot taken into consideration, the range of rotation of the robot torso during the balance control process can be effectively reduced, and the robot can be controlled to return to its initial pose (e.g., pose show in FIG. 2), so as to avoid the occurrence of robot falling over.

Figure 3:
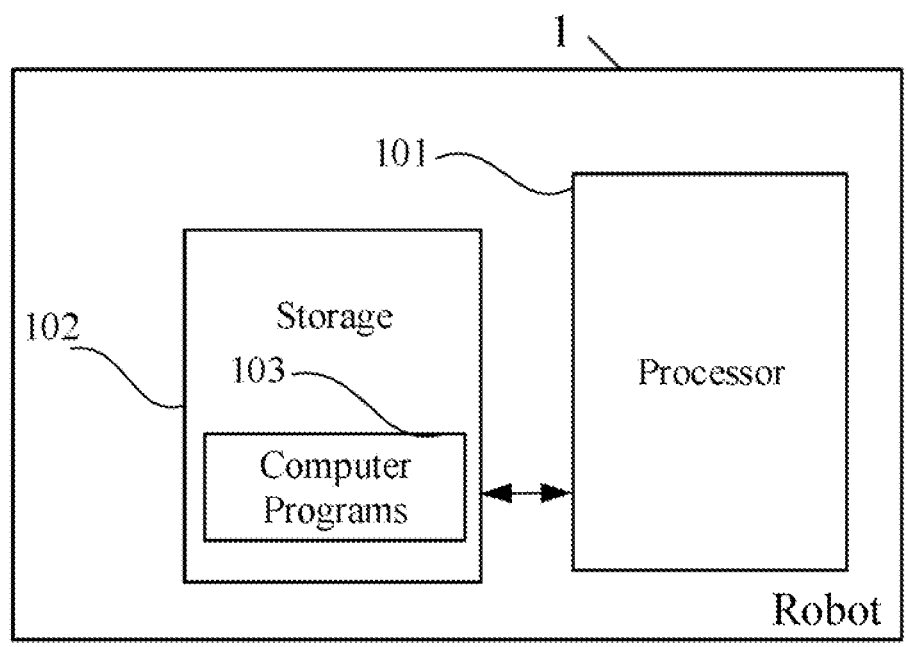
FIG. 3 is a schematic block diagram of a biped robot according to one embodiment.
Figure 4:
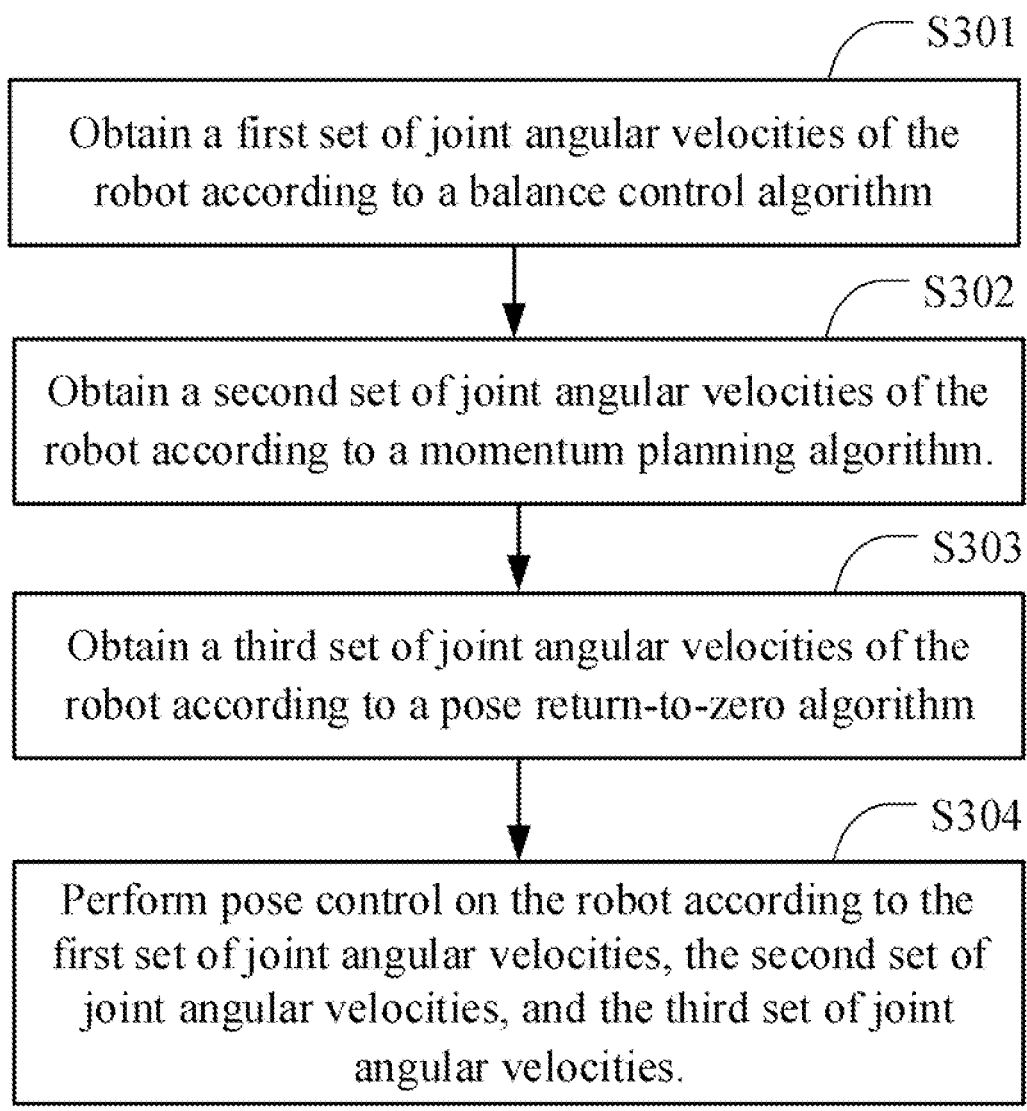
FIG. 4 is a schematic flowchart of a pose control. method according to one embodiment.

FIG. 3 shows a schematic block diagram of the biped robot 1 according to one embodiment. The robot 1 may include a processor 101, a storage 102, and one or more executable computer programs 103 that are stored in the storage 102. The processor 101 is electrically connected to the storage 105, and performs corresponding operations by executing the executable computer programs 103 stored in the storage 102. When the processor 101 executes the computer programs 103, the steps in the embodiments of the method for controlling the robot 1, such as steps S301 through S304 in FIG. 4 are implemented.

The processor 101 may be a central processing unit (CPU), a general-purpose processor, a digital signal processor (DSP), an application specific integrated circuit (ASIC), a field-programmable gate array (FPGA), a programmable logic device, a discrete gate, a transistor logic device, or a discrete hardware component. The general-purpose processor may be a microprocessor or any conventional processor or the like.

The storage 102 may be an internal storage unit of the robot 1, such as a hard disk or a memory. The storage 102 may also be an external storage device of the robot 1, such as a plug-in hard disk, a smart memory card (SMC), and a secure digital (SD) card, or any suitable flash cards. Furthermore, the storage 102 may also include both an internal storage unit and an external storage device. The storage 102 is used to store computer programs, other programs, and data required by the robot. The storage 102 can also be used to temporarily store data that have been output or is about to be output.

Figure 6:
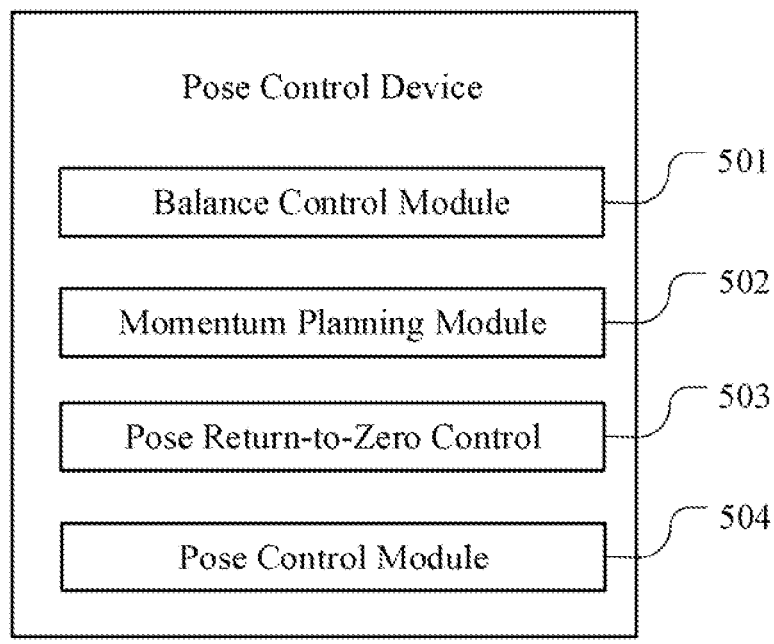
FIG. 6 is a schematic block diagram of a pose control device according to one embodiment.

Exemplarily, the one or more computer programs 103 may be divided into one or more modules/units, and the one or more modules/units are stored in the storage 102 and executable by the processor 101. The one or more modules/units may be a series of computer program instruction segments capable of performing specific functions, and the instruction segments are used to describe the execution process of the one or more computer programs 103 in the robot 1. For example, the one or more computer programs 112 may be divided into a balance control module 501, a momentum planning module 502, a pose return-to-zero control module 503, and a pose control module 504 as shown in FIG. 6.

FIG. 4 shows an exemplary flowchart of a pose control method according to one embodiment. The method can be implemented to control the robot 1 shown in FIG. 2. In one embodiment, the method may include steps S301 to S304.

Step S301: Estimate a first set of joint angular velocities of all joints of the robot 1 according to a balance control algorithm.

In one embodiment, the first set of joint angular velocities may be calculated by a first controller. The first controller may be implemented in the form of a computer software. The balance control for biped robots is a relatively mature technology in the existing technologies. According to different scenarios, different control methods can be used, and the specific input parameters and control structures can be also different. In the embodiments of the present disclosure, any conventional suitable balance control method can be used according to actual needs to estimate the desired joint angular velocities of the robot 1 for balance control. The joint angular velocities are also referred to as first joint angular velocities and denoted as $\omega_1$.

Step S302: Estimate a second set of joint angular velocities of all joints of the robot 1 according to a momentum planning algorithm.

In one embodiment, the second set of joint angular velocities may be calculated by a second controller. The second controller may be implemented in the form of a computer software. When the robot 1 performs balance control, it will generate rotational momentum that tilts the pose of the robot torso. The purpose of the whole momentum planning is to gradually reduce the rotational momentum through the whole-body joint planning, until the rotational momentum is decreased to zero.

For a multi-joint robot, the rotation of all of the joints of the robot will affect the overall momentum of the robot. In one embodiment, the mapping relationship between the momentum of the robot and the joint angular velocities of the robot can be established in advance according to the following equation: $m = A\omega$, where A represents a predefined mapping matrix whose value can be set according to the actual situation, and is not limited in the embodiments of the present disclosure, $\omega$ represents the joint angular velocities of the robot, and m represents the momentum of the robot which is a six-dimensional momentum including three-dimensional linear momentum and three-dimensional rotational momentum.

According to the mapping relationship, in one embodiment, actual joint angular velocities of the robot can be obtained through preset sensors, and the actual momentum of the robot is calculated based on the actual joint angular velocities according to the following equation: $m_{feedback} = A\omega_{feedback}$, where $\omega_{feedback}$ represents the actual joint angular velocities, and $m_{feedback}$ represents the actual momentum of the robot.

In order to suppress the rotation of the robot, a counter-rotational momentum can be applied to the robot. In one embodiment, the counter-rotational momentum can be constructed according to the actual rotational momentum of the robot about an x-axis direction and a y-axis direction. The positive direction of the x-axis direction refers to the travelling direction of the robot, and the positive direction of the y-axis direction points away from the left side of the robot torso, or the direction the robot faces after rotating 90 degrees counterclockwise. In one embodiment, the counter-rotational momentum can be constructed according to the following equation:

$$m_2 = \begin{bmatrix} 0 \\ 0 \\ 0 \\ -k_x \times m_{feedback}(0) \\ -k_y \times m_{feedback}(1) \\ 0 \end{bmatrix},$$

where $k_x$ and $k_y$ are preset proportional constants, and their values can be set according to actual conditions, which are not limited in the embodiment of the present disclosure. In one embodiment, $k_x \in (0,1)$ and $k_y \in (0,1)$. $m_{feedback}(0)$ represents a rotational component of the actual momentum in an x-axis direction, $m_{feedback}(1)$ represents a rotational component of the actual momentum in a y-axis direction, and $m_2$ represents the counter-rotational momentum. The counter-rotational momentum can only weaken the influence of external disturbances on the x-axis and y-axis on the robot, but not the linear speed and the rotation speed of the robot in the z-axis direction, which can reduce the interference to the control effects of other controllers of the robot. The z-axis here refers to the vertical axis along the heightwise direction of the robot.

After the counter-rotational momentum is determined, the joint angular velocities corresponding to this counter-rotational momentum can be calculated according to the mapping relationship above. These joint angular velocities are also referred to as second joint angular velocities. In one embodiment, the second joint angular velocities can be calculated according to the following equation: $\omega_2 = A^* m_2$, where A represents the predefined mapping matrix, $A^*$ represents a generalized inverse matrix of A, $m_2$ represents the counter-rotational momentum, and $\omega_2$ represents the second set of joint angular velocities.

Step S303: Estimate a third set of joint angular velocities of all joints of the robot according to a pose return-to-zero algorithm.

In one embodiment, the third set of joint angular velocities may be calculated by a third controller. The third controller may be implemented in the form of a computer software. When the robot is in a relatively stable state, the effect of balance control will be relatively small, the rotational momentum of the robot will gradually become smaller due to the effect of momentum planning control, but the pose of the robot will not automatically return to the initial pose of the robot. In one embodiment, the pose of the robot is gradually returned to the initial pose through the pose return-to-zero control.

In one embodiment, the rotation angles of the joints of the robot in the initial pose can be determined in advance. A reverse joint angular velocity can be determined according to the deviation between the actual rotation angle of each joint in the current state and a corresponding initial rotation angle, so that the current joint rotation angles of the joints gradually approach the initial joint rotation angles. However, this kind of pose return-to-zero control based on the joint level may cause some strange poses at the end of each link of the robot in the process of restoring the robot's pose.

To avoid this situation, in one embodiment, a pose return-to-zero control based on the end pose may be adopted. In the embodiment, it is assumed that the robot includes two arms, two legs, a head, and a torso. A robot coordinate system {O} is established on the geometric center of the torso, and five end coordinate systems {Oi} are established on the ends of the arms, legs, and head, $i \in 1, 2, 3, 4, 5$. When the robot is in the initial state, the pose of each end coordinate system in the robot coordinate system (i.e., the initial pose) is recorded.

When the robot's end pose gradually deviates from the initial pose due to balance control and momentum planning control, the actual pose of each end can be determined through joint angle feedback and kinematics. In order to make the actual pose of the robot gradually approach the initial pose, the desired speed of the recovery pose of each end can be calculated according to the actual pose and the initial pose of each end.

For the i-th end, the desired speed of the recovery pose can be calculated according to the following equation: $v_i = k_i(p_{init,i} - p_{real,i})$, where $p_{init,i}$ represents the initial pose of the i-th end, $p_{real,i}$ represents the actual pose of the i-th end, $k_i$ represents a preset proportional constant, and its value can be set according to actual conditions, which is not limited in the embodiment of the present disclosure, and $v_i$ represents the desired speed of the i-th end.

After the desired speed of each end is obtained, the joint angular velocities can be calculated based on these desired speeds according to the following equation: $\omega_{3,i} = J_i v_i$, where $J_i$ represents a kinematic Jacobian matrix from the robot coordinate system {O} to the i-th end coordinate system {O}, and $\omega_{3,i}$ represents the joint angular velocities of all joints in an i-th chain. Here, the i-th chain includes all joints and links from the origin of the robot coordinate system to the i-th end coordinate system.

After the joint angular velocities of the robot are obtained, the joint angular velocities are combined to determine joint angular velocities for pose recovery control, which are also referred to as third joint angular velocities. The third joint angular velocities are denoted as $$\omega_3 = \begin{bmatrix} \omega_{3,1} \\ \omega_{3,2} \\ \omega_{3,3} \\ \omega_{3,4} \\ \omega_{3,5} \end{bmatrix},$$

where $\omega_3$ represents the third joint angular velocities.

Step S304: Perform pose control on the robot according to the first set of joint angular velocities, the second set of joint angular velocities, and the third set of joint angular velocities.

Figure 5:
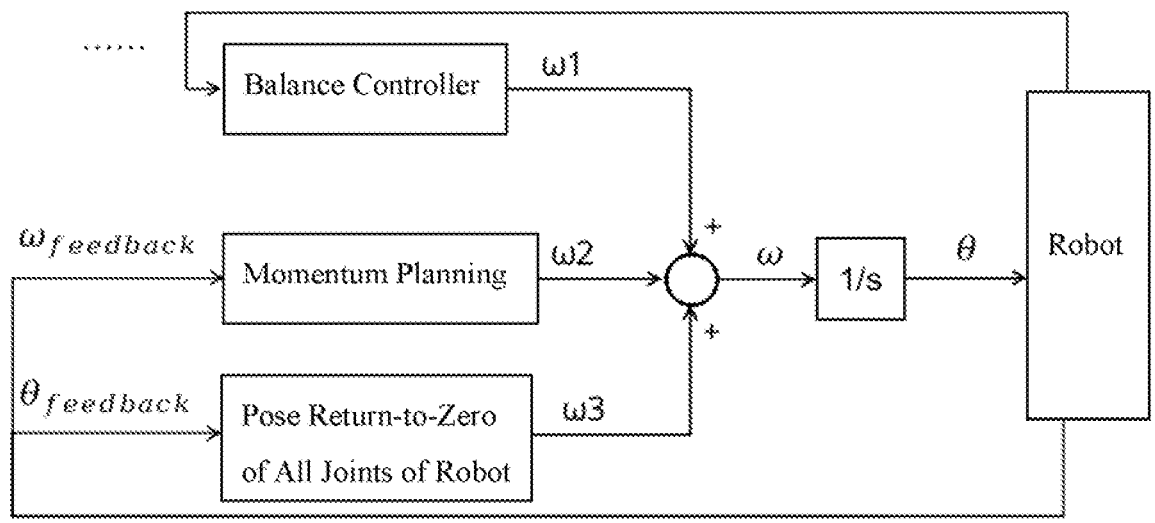
FIG. 5 is a schematic block diagram of the robot's pose control according to one embodiment.

FIG. 5 is a schematic block diagram of the robot's pose control according to one embodiment. The balance control process generates the first joint angular velocities $\omega_1$, the momentum planning process generates the second joint angular velocities $\omega_2$, and the pose return-to-zero control process generates the third joint angular velocities $\omega_3$. The desired joint angular velocities of the robot can be calculated according to the following equation: $\omega = \omega_1 + \omega_2 + \omega_3$, where $\omega$ represents the desired joint angular velocities of the robot. It should be noted that weight factors may be taken into consideration in some embodiments. In this case, the equation above may be updated as follows: $\omega = W_1 \omega_1 + W_2 \omega_2 + W_3 \omega_3$, where $W_1$, $W_2$, and $W_3$ represent the corresponding weighting factors.

The desired joint angular velocities are integrated (by the block 1/s in FIG. 5) to determine the desired joint angles of the robot, which are denoted as $\theta$ here. After the desired joint angles are calculated, they are sent to the corresponding actuating components of the robot to control each corresponding joints of the robot to move according to the desired joint angles, so as to realize the pose control of the robot.

By implementing the method as described in the embodiments above, the range of rotation of the torso of the robot during the balance control process can be effectively reduced, and the robot can be controlled to return to its initial pose, thereby avoiding the occurrence of robot falling over.

It should be noted that the sequence numbers in the foregoing embodiments do not mean the sequence of execution. The execution sequence of each process should be determined by its function and internal logic, and should not constitute any limitation on the implementation process of the embodiments of the present disclosure.

FIG. 6 is a schematic block diagram of a robot pose control device according to one embodiment. In one embodiment, the device may include a balance control module 501, a momentum planning module 502, a pose return-to-zero control module 503, and a pose control module 504. The balance control module 501 is to estimate a first set of joint angular velocities of all joints of the robot 1 according to a balance control algorithm. The momentum planning module 502 is to estimate a second set of joint angular velocities of all joints of the robot 1 according to a momentum planning algorithm. The pose return-to-zero control module 503 is to estimate a third set of joint angular velocities of all joints of the robot according to a pose return-to-zero algorithm. The pose control module 504 is to perform pose control on the robot according to the first set of joint angular velocities, the second set of joint angular velocities, and the third set of joint angular velocities.

In one embodiment, the momentum planning module 502 may include an actual joint angular velocity obtaining unit, an actual momentum calculation unit, a counter-rotational momentum constructing unit, and a second joint angular velocity calculating unit. The actual joint angular velocity obtaining unit is to obtain actual joint angular velocities of the robot. The actual momentum calculation unit is to calculate an actual momentum of the robot according to the actual joint angular velocities. The counter-rotational momentum constructing unit is to construct a counter-rotational momentum corresponding to the actual momentum. The second joint angular velocity calculating unit is to calculate the second set of joint angular velocities according to the counter-rotational momentum.

In one embodiment, the actual momentum of the robot is calculated according to the following equation: $m_{feedback} = A \omega_{feedback}$, where A represents a predefined mapping matrix, $\omega_{feedback}$ represents the actual angular velocities, and $m_{feedback}$ represents the actual momentum of the robot.

In one embodiment, the counter-rotational momentum is constructed according to the following equation:

$$m_2 = \begin{bmatrix} 0 \\ 0 \\ 0 \\ -k_x \times m_{feedback}(0) \\ -k_y \times m_{feedback}(1) \\ 0 \end{bmatrix},$$

where $m_{feedback}(0)$ represents a rotational represents component of the actual momentum in an x-axis direction, $m_{feedback}(1)$ represents a rotational component of the actual momentum in a y-axis direction, and $m_2$ represents the counter-rotational momentum.

In one embodiment, the second set of joint angular velocities is calculated according to the following equation: $\omega_2 = A^* m_2$, where A represents a predefined mapping matrix, $A^*$ represents a generalized inverse matrix of A, $m_2$ represents the counter-rotational momentum, and $\omega_2$ represents the second set of joint angular velocities.

In one embodiment, the pose return-to-zero control module 503 may include an actual pose obtaining unit, a desired speed calculating unit, a joint angular velocity calculating unit, and a combining unit. The actual pose obtaining unit is to obtain an actual pose of each end of the robot. The desired speed calculating unit is to calculate a desired speed of each end of the robot according to the actual pose and a predefined initial pose of each end of the robot. The joint angular velocity calculating unit is to calculate joint angular velocities of the robot according to the desired speed of each end of the robot. The combining unit is to combine the joint angular velocities of the robot into the third joint angular velocities.

In one embodiment, the joint angular velocities of the robot are calculated according to the following equation: $\omega_{3,i} = J_i v_i$, where $v_i$ represents the desired speed of an i-th end of the robot, $J_i$ represents a kinematic Jacobian matrix from a robot coordinate system to the i-th coordinate system, $\omega_{3,i}$ represents joint angular velocities of all joints in an i-th chain. Here, the i-th chain includes all joints and links from the origin of the robot coordinate system to the i-th end coordinate system.

In one embodiment, the pose control module 504 may include a desired joint angular velocity calculating unit, a desired joint angle calculating unit, and a control unit. The desired joint angular velocity calculating unit is to calculate desired joint angular velocities of the robot according to first set of joint angular velocities, the second set of joint angular velocities, and the third set of joint angular velocities. The desired joint angle calculating unit is to calculate desired joint angles of the robot according to the desired joint angular velocities. The control unit is to control a pose of the robot according to the desired joint angles.

A person having ordinary skill in the art may clearly understand that, for the convenience and conciseness of description, the specific working processes of the above-described devices, modules and units can refer to the corresponding processes in the foregoing method embodiments, and will not be repeated here.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random-access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals. It should be noted that, the content included in the computer readable medium could be appropriately increased and decreased according to requirements of legislation and patent practice under judicial jurisdictions. For example, in some judicial jurisdictions, the computer readable medium does not include the electric carrier signal and the telecommunication signal according to the legislation and the patent practice.

The embodiments above are only illustrative for the technical solutions of the present disclosure, rather than limiting the present disclosure. Although the present disclosure is described in detail with reference to the above embodiments, those of ordinary skill in the art should understand that they still can modify the technical solutions described in the foregoing various embodiments, or make equivalent substitutions on partial technical features; however, these modifications or substitutions do not make the nature of the corresponding technical solution depart from the spirit and scope of technical solutions of various embodiments of the present disclosure, and all should be included within the protection scope of the present disclosure.

The embodiments above are only illustrative for the technical solutions of the present disclosure, rather than limiting the present disclosure. Although the present disclosure is described in detail with reference to the above embodiments, those of ordinary skill in the art should understand that they still can modify the technical solutions described in the foregoing various embodiments, or make equivalent substitutions on partial technical features; however, these modifications or substitutions do not make the nature of the corresponding technical solution depart from the spirit and scope of technical solutions of various embodiments of the present disclosure, and all should be included within the protection scope of the present disclosure.

What is claimed is:

1. A computer-implemented pose control method for a robot, comprising:
   estimating a first set of joint angular velocities of all joints of the robot according to a balance control algorithm;
   estimating a second set of joint angular velocities of all joints of the robot according to a momentum planning algorithm;
   estimating a third set of joint angular velocities of all joints of the robot according to a pose return-to-zero algorithm; and
   performing pose control on the robot according to the first set of joint angular velocities, the second set of joint angular velocities, and the third set of joint angular velocities;
   wherein estimating the second set of joint angular velocities of all joints of the robot according to the momentum planning algorithm comprises:
   obtaining actual joint angular velocities of the robot;
   calculating an actual momentum of the robot according to the actual joint angular velocities;
   constructing a counter-rotational momentum corresponding to the actual momentum; and
   calculating the second set of joint angular velocities according to the counter-rotational momentum; and
   wherein the actual momentum of the robot is calculated according to the following equation: $m_{feedback}=A\omega_{feedback}$, where A represents a predefined mapping matrix, $\omega_{feedback}$ represents the actual angular velocities, and $m_{feedback}$ represents the actual momentum of the robot.

2. The method of claim 1, wherein the counter-rotational momentum is constructed according to the following equation:

$$m_2 = \begin{bmatrix} 0 \\ 0 \\ 0 \\ -k_x \times m_{feedback}(0) \\ -k_y \times m_{feedback}(1) \\ 0 \end{bmatrix},$$

where $m_{feedback}(0)$ represents a rotational component of the actual momentum in an x-axis direction, $m_{feedback}(1)$ represents a rotational component of the actual momentum in a y-axis direction, and $m_2$ represents the counter-rotational momentum.

3. The method of claim 1, wherein the second set of joint angular velocities is calculated according to the following equation: $\omega_2=A^*m_2$, where A represents the predefined mapping matrix, $A^*$ represents a generalized inverse matrix of A, $m_2$ represents the counter-rotational momentum, and $\omega_2$ represents the second set of joint angular velocities.

4. The method of claim 1, wherein estimating the third set of joint angular velocities of all joints of the robot according to the pose return-to-zero algorithm comprises:
   obtaining an actual pose of each end of the robot, wherein the ends of the robot comprise ends of arms of the robot or ends of feet of the robot;
   calculating a desired speed of each end of the robot according to the actual pose and a predefined initial pose of each end of the robot;
   calculating joint angular velocities of the robot according to the desired speed of each end of the robot; and
   combining the joint angular velocities of the robot into the third joint angular velocities.

5. The method of claim 4, wherein the joint angular velocities of the robot are calculated according to the following equation: $\omega_{3,i}=J_i v_i$, where $v_i$ represents the desired speed of an i-th end of the robot, $J_i$ represents a kinematic Jacobian matrix from a robot coordinate system to an i-th end coordinate system, $\omega_{3,i}$ represents angular velocities of all joints in an i-th chain.

6. The method of claim 1, wherein performing pose control on the robot according to the first set of joint angular velocities, the second set of joint angular velocities, and the third set of joint angular velocities, comprises:
calculating desired joint angular velocities of the robot according to the first set of joint angular velocities, the second set of joint angular velocities, and the third set of joint angular velocities;
calculating desired joint angles of the robot according to the desired joint angular velocities; and
controlling a pose of the robot according to the desired joint angles.

7. A robot comprising:
one or more processors;
a memory; and
one or more programs, wherein the one or more programs are stored in the memory and configured to be executed by the one or more processors, the one or more programs comprises:
instructions for estimating a first set of joint angular velocities of all joints of the robot according to a balance control algorithm;
instructions for estimating a second set of joint angular velocities of all joints of the robot according to a momentum planning algorithm;
instructions for estimating a third set of joint angular velocities of all joints of the robot according to a pose return-to-zero algorithm; and
instructions for performing pose control on the robot according to the first set of joint angular velocities, the second set of joint angular velocities, and the third set of joint angular velocities;
wherein the instructions for estimating the third set of joint angular velocities of all joints of the robot according to the pose return-to-zero algorithm comprise:
instructions for obtaining an actual pose of each end of the robot, wherein the ends of the robot comprise ends of arms of the robot or ends of feet of the robot;
instructions for calculating a desired speed of each end of the robot according to the actual pose and a predefined initial pose of each end of the robot;
instructions for calculating joint angular velocities of the robot according to the desired speed of each end of the robot; and
instructions for combining the joint angular velocities of the robot into the third joint angular velocities; and
wherein the joint angular velocities of the robot are calculated according to the following equation: $\omega_{3,i}=J_i v_i$, where $v_i$ represents the desired speed of an i-th end of the robot, $J_i$ represents a kinematic Jacobian matrix from a robot coordinate system to an i-th end coordinate system, $\omega_{3,i}$ represents joint angular velocities of all joints in an i-th chain.

8. The robot of claim 7, wherein the instructions for estimating the second set of joint angular velocities of all joints of the robot according to the momentum planning algorithm comprise:
instructions for obtaining actual joint angular velocities of the robot;
instructions for calculating an actual momentum of the robot according to the actual joint angular velocities;
instructions for constructing a counter-rotational momentum corresponding to the actual momentum; and
instructions for calculating the second set of joint angular velocities according to the counter-rotational momentum.

9. The robot of claim 8, wherein the actual momentum of the robot is calculated according to the following equation: $m_{feedback}=A\omega_{feedback}$, where A represents a predefined mapping matrix, $\omega_{feedback}$ represents the actual angular velocities, and $m_{feedback}$ represents the actual momentum of the robot.

10. The robot of claim 8, wherein the counter-rotational momentum is constructed according to the following equation:

$$m_2 = \begin{bmatrix} 0 \\ 0 \\ 0 \\ -k_x \times m_{feedback}(0) \\ -k_y \times m_{feedback}(1) \\ 0 \end{bmatrix},$$

where $m_{feedback}(0)$ represents a rotational component of the actual momentum in an x-axis direction, $m_{feedback}(1)$ represents a rotational component of the actual momentum in a y-axis direction, and $m_2$ represents the counter-rotational momentum.

11. The robot of claim 8, wherein the second set of joint angular velocities is calculated according to the following equation: $\omega_2=A^* m_2$, where A represents a predefined mapping matrix, $A^*$ represents a generalized inverse matrix of A, $m_2$ represents the counter-rotational momentum, and $\omega_2$ represents the second set of joint angular velocities.

12. The robot of claim 7, wherein the instructions for performing pose control on the robot according to the first set of joint angular velocities, the second set of joint angular velocities, and the third set of joint angular velocities, comprises:
instructions for calculating desired joint angular velocities of the robot according to the first set of joint angular velocities, the second set of joint angular velocities, and the third set of joint angular velocities;
instructions for calculating desired joint angles of the robot according to the desired joint angular velocities; and
instructions for controlling a pose of the robot according to the desired joint angles.

13. A non-transitory computer-readable storage medium storing one or more programs to be executed in a robot, the one or more programs, when being executed by one or more processors of the legged robot, causing the robot to perform processing comprising:
estimating a first set of joint angular velocities of all joints of the robot according to a balance control algorithm;
estimating a second set of joint angular velocities of all joints of the robot according to a momentum planning algorithm;
estimating a third set of joint angular velocities of all joints of the robot according to a pose return-to-zero algorithm; and
performing pose control on the robot according to the first set of joint angular velocities, the second set of joint angular velocities, and the third set of joint angular velocities;
wherein estimating the second set of joint angular velocities of all joints of the robot according to the momentum planning algorithm comprises:
obtaining actual joint angular velocities of the robot;

calculating an actual momentum of the robot according to the actual joint angular velocities;

constructing a counter-rotational momentum corresponding to the actual momentum; and calculating the second set of joint angular velocities, by using a predefined mapping matrix and a generalized inverse matrix of the predefined mapping matrix, according to the counter-rotational momentum.

14. The computer-readable storage medium of claim 13, wherein the actual momentum of the robot is calculated according to the following equation: $m_{feedback} = A\omega_{feedback}$, where A represents the predefined mapping matrix, $\omega_{feedback}$ represents the actual angular velocities, and $m_{feedback}$ represents the actual momentum of the robot.

15. The computer-readable storage medium of claim 13, wherein the counter-rotational momentum is constructed according to the following equation:

$$m_2 = \begin{bmatrix} 0 \\ 0 \\ 0 \\ -k_x \times m_{feedback}(0) \\ -k_y \times m_{feedback}(1) \\ 0 \end{bmatrix},$$

where $m_{feedback}(0)$ represents a rotational component of the actual momentum in an x-axis direction, $m_{feedback}(1)$ represents a rotational component of the actual momentum in a y-axis direction, and $m_2$ represents the counter-rotational momentum.

16. The computer-readable storage medium of claim 15, wherein $k_x$ and $k_y$ are preset proportional constants, $k_x \in (0, 1)$, and $k_y \in (0,1)$.

17. The computer-readable storage medium of claim 13, wherein estimating the third set of joint angular velocities of all joints of the robot according to the pose return-to-zero algorithm comprises:

obtaining an actual pose of each end of the robot, wherein the ends of the robot comprise ends of arms of the robot or ends of feet of the robot;

calculating a desired speed of each end of the robot according to the actual pose and a predefined initial pose of each end of the robot;

calculating joint angular velocities of the robot according to the desired speed of each end of the robot; and combining the joint angular velocities of the robot into the third joint angular velocities.

18. The computer-readable storage medium of claim 17, wherein the joint angular velocities of the robot are calculated according to the following equation: $\omega_{3,i} = J_i v_i$, where $v_i$ represents the desired speed of an i-th end of the robot, $J_i$ represents a kinematic Jacobian matrix from a robot coordinate system to an i-th end coordinate system, $\omega_{3,i}$ represents angular velocities of all joints in an i-th chain.

19. The computer-readable storage medium of claim 13, wherein performing pose control on the robot according to the first set of joint angular velocities, the second set of joint angular velocities, and the third set of joint angular velocities, comprises:

calculating desired joint angular velocities of the robot according to the first set of joint angular velocities, the second set of joint angular velocities, and the third set of joint angular velocities;

calculating desired joint angles of the robot according to the desired joint angular velocities; and controlling a pose of the robot according to the desired joint angles.

20. The computer-readable storage medium of claim 19, wherein the desired joint angles of the robot is calculated by integrating the desired joint angular velocities of the robot.

* * * * *